US012793535B2

(12) United States Patent
Leka

(10) Patent No.: US 12,793,535 B2
(45) Date of Patent: Nov. 10, 2026

(54) AI SYSTEMS AND METHODS FOR ENVIRONMENTAL EXPOSURE AND EARLY HEALTH RISK ALERTS

(71) Applicant: JUMPTUIT HEALTH, INC., New York, NY (US)

(72) Inventor: Donald Leka, New York, NY (US)

(73) Assignee: Jumptuit Health, Inc., New York, NY (US)

( * ) Notice: Subject to any disclaimer, the term of this patent is extended or adjusted under 35 U.S.C. 154(b) by 19 days.

(21) Appl. No.: 18/951,357

(22) Filed: Nov. 18, 2024

(65) Prior Publication Data

US 2025/0166492 A1 May 22, 2025

Related U.S. Application Data

(60) Provisional application No. 63/599,978, filed on Nov. 16, 2023.

(51) Int. Cl.

| | |
|---|---|
| ***G08B 31/00*** | (2006.01) |
| ***G08B 21/02*** | (2006.01) |
| ***H04W 4/021*** | (2018.01) |
| ***H04W 4/90*** | (2018.01) |

(52) U.S. Cl.

CPC ............. *G08B 31/00* (2013.01); *G08B 21/02* (2013.01); *H04W 4/021* (2013.01); *H04W 4/90* (2018.02)

(58) Field of Classification Search

CPC ......... G08B 31/00; G08B 21/02; H04W 4/90; H04W 4/021

USPC ........................................................ 340/573.1

See application file for complete search history.

(56) References Cited

U.S. PATENT DOCUMENTS

| | | | | |
|---|---|---|---|---|
| 7,834,759 | B2 * | 11/2010 | Charlier .................. | G01J 1/429 600/407 |
| 10,834,548 | B2 * | 11/2020 | Mesirow ................. | H04L 67/30 |
| 11,504,011 | B1 * | 11/2022 | Jain ........................... | G06N 5/04 |
| 2017/0039339 | A1 * | 2/2017 | Bitran ..................... | G16H 50/30 |
| 2023/0197270 | A1 * | 6/2023 | Yan ......................... | G16H 70/20 705/2 |

* cited by examiner

*Primary Examiner* — Kerri L Mcnally

(74) *Attorney, Agent, or Firm* — Sprinkle IP Law Group

(57) ABSTRACT

A system for providing geolocated, early health alerts is configured to receive a geolocation and a future time, load current exposure variables for the geolocation and a recent increment, where the current exposure variables represent conditions that are potentially detrimental to the health of an individual, analyze by an artificial intelligence engine the current exposure variables to identify a pattern in the current exposure variables and use the pattern to forecast future exposure variables, based on the personal health and data attributes from an individual's health profile and the forecasted future exposure variables, determine that the individual is at risk of a health event, and generate an alert to the individual of the health event, the alert associated with the geolocation and future time.

15 Claims, 5 Drawing Sheets

AI SYSTEMS AND METHODS FOR ENVIRONMENTAL EXPOSURE AND EARLY HEALTH RISK ALERTS

RELATED APPLICATIONS

This application claims the benefit of priority under 35 U.S.C. § 119(e) of U.S. Provisional Application 63/599,978, entitled "Machine Learning/AI Systems and Methods for Environmental Exposure and Health Risk Susceptibility Assessment," filed Nov. 16, 2023, which is hereby fully incorporated by reference herein.

TECHNICAL FIELD

This application relates generally to artificial intelligence. Even more particularly, embodiments of the present application relate to artificial intelligence for providing early alerts of environmental exposures and health risks.

BACKGROUND

Many people have health conditions that make them prone to health events or more susceptible to environmental, disease, or toxin exposures. Traveling for such individuals can be difficult to plan and, in some cases, dangerous because co-exposures that do not exist at home may trigger health events when they are traveling.

A common step in modern trip planning is for the traveler to look up weather forecasts online for their destination and points along the way. While some weather forecasts include generalized health alerts, such as alerts of extreme temperatures or poor air quality that may trigger asthma, these alerts are triggered based on simple general thresholds and are not specific to the individual's health profile.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Embodiments of the present disclosure provide AI-based systems and methods for predicting individualized health risks based on location, time, and individual and providing health risk warnings to users. According to one embodiment, a health data system agnostically observes the pure movement of variables in relation to each other over time. The system builds a granular dynamic geolocation map of exposures that are potentially detrimental to an individual's personal health profile. According to one embodiment, a health data application identifies the variables and coupled variables (two or more variables) that exceed health risk thresholds and observes the trends of variables that have not (yet) exceeded thresholds to provide the earliest possible health alerts and notifications.

Embodiments of the present disclosure provide an advantage by providing individualized early alerts of exposures and co-exposures that may trigger health events.

Embodiments of the present disclosure provide another advantage by using more recent data to determine trends that can be used to forecast exposure variables.

Further, because the physical environment at a geolocation is dynamic and constantly changing, embodiments incorporate dynamic and constantly changing data—focusing on recent and current environmental exposures and co-exposures for health forecasts rather than traditional historical records. While some embodiments may keep large amounts of historical data, other embodiments retrieve exposure variable data as needed (e.g., as a forecast is called) and discard the data once the forecast has been made or at the occurrence of other predefined events.

Figure 1:
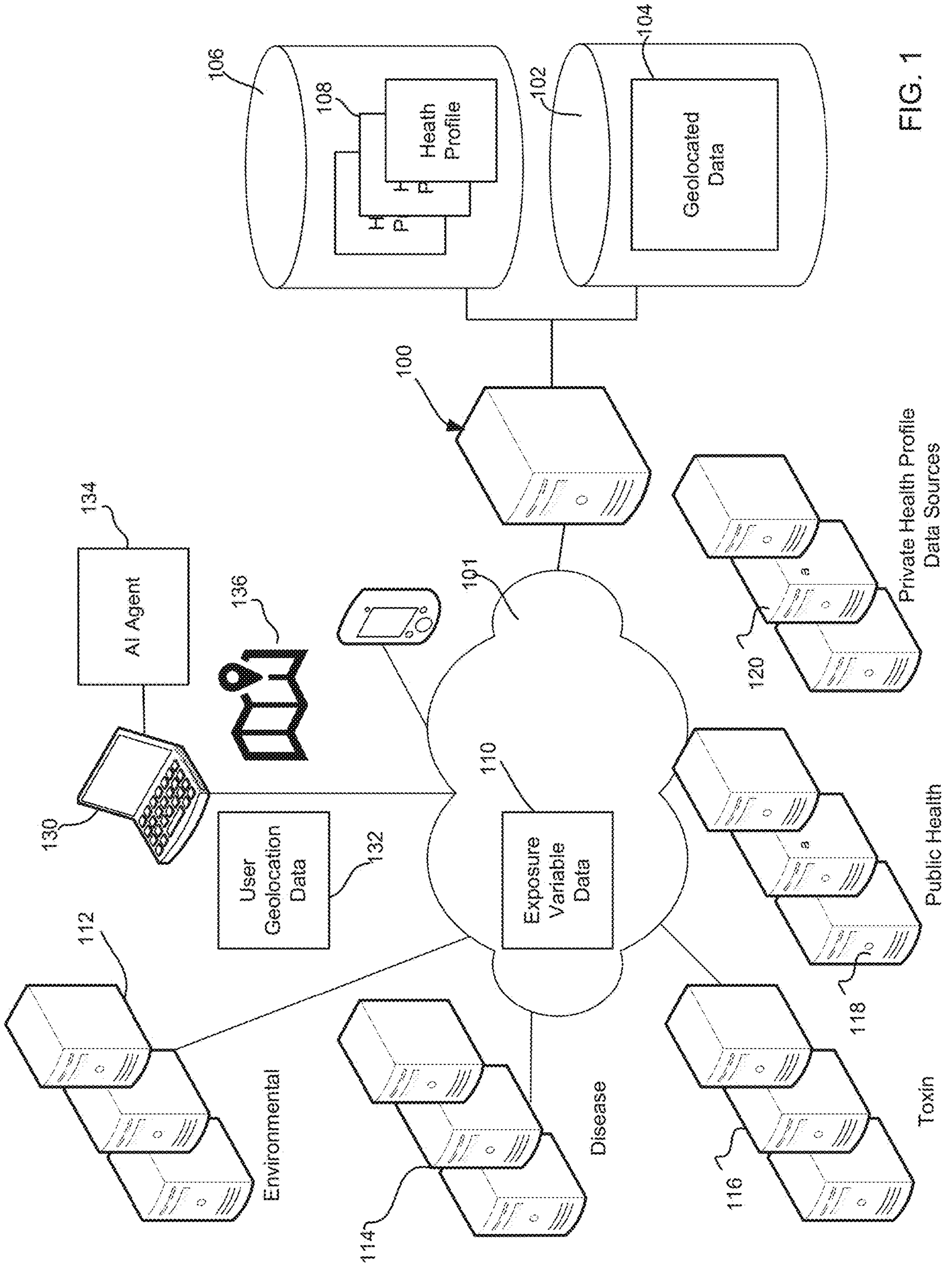
FIG. 1 is a diagrammatic representation of one embodiment of a computer environment for artificial intelligence (AI)-based health assessment and alerts.

FIG. 1 is a diagrammatic representation of one embodiment of a computer environment for artificial intelligence (AI)-based health assessment and alerts. The computer environment of FIG. 1 comprises a health data system (HDS) 100 coupled to a number of data sources and clients by a network 101, which comprises the Internet, a wide area network, a local area network, wired network, or wireless network, including combinations of such networks in some embodiments. HDS 100 includes a geolocated data database 102 of geolocated data 104 and a health profile database 106 of health profiles 108 for individuals and of exposures that are potentially detrimental to an individual's personal health profile.

HDS 100 comprises a computer system with central processing processors executing instructions embodied on a computer readable media where the instructions are configured to perform at least some of the functionality associated with embodiments described herein. According to one embodiment, the computer system comprises one or more cloud computer systems running a cloud-based AI health data application. HDS 100 applies artificial intelligence and machine learning to provide services related to individualized health assessments and warnings, including, but not limited to, providing early health risk warnings based on geolocation.

Geolocated data 104 comprises exposure variables (e.g., bound exposure variables with values) associated with time interval/geolocation pairs. Exposure variables are variables that represent conditions that may be detrimental to the health of an individual. According to one embodiment, the types of exposure variables for which data is collected include one or more of: environmental exposure variables, disease exposure variables, or toxin exposure variables. Examples of environmental exposure variables include, but are not limited to, temperature, humidity, Air Quality Index (AQI), PM2.5, Ozone (O3), Nitrogen Dioxide (NO2), Sulfur Dioxide (SO2), barometric pressure (kPa), and altitude. Examples of disease exposure variables include cases of various types of diseases. Even more particularly, examples of disease exposure variables include, but are not limited to concentrations of cases of Influenza, Rhinitis, Respiratory Syncytial Virus (RSV); or reports of zoonotic disease transmission (e.g., Rabies, pigeon and goose droppings, or Harmful Algae Blooms). Examples of toxin exposure variables include cases of various toxins and airborne chemicals or irritants. Examples of toxin exposure variables include, but are not limited to, pollen counts, or counts pollutants (e.g., from factories, oil refineries, power plants). In some cases, geolocated data includes current values for time intervals (e.g., the values reported for a particular interval) and forecasted values. The level of temporal and geographic granularity of geolocated data 104 may vary by implementation.

In the arrangement of FIG. 1, HDS 100 collects exposure variable data 110 from environmental exposure data sources 112, disease exposure data sources 114, and toxin exposure data from toxin exposure data sources 116. Source data for exposure variables is available from local, national, and international governmental, non-profit, and private organizations that provide publicly available APIs through which environmental data, disease data, toxin exposure data, and health data can be collected. In some cases, past, current, and forecast environmental data, disease data and toxin exposure data is available. Examples of data sources for exposure variable data include, but are not limited to, APIs provided by the National Oceanic and Atmospheric Administration, Center for Disease Control and Prevention, Environmental Protection Agency, National Institute for Health, United Nations, World Health Organization, as well as state, county and municipal agencies. A number of these sources provide forecasts for exposure variable data (e.g., a weather forecast with a forecast temperature, an allergy forecast, etc.).

The collected exposure variable data is temporally located in that it has an associated time to which it applies and geolocated in that it has an associated geographic location to which it applies. In one embodiment, HDS 100 maps ingested exposure data to a common system of time intervals and geographic units used for geolocated data. HDS 100 continually collects data for exposure variables from the data sources and correlates the variables based on time interval and geolocations to which the variable values apply. For a given time interval and geolocation, the exposure variable data in geolocated data 104 can include the current data for the exposure variables (current exposure variables for the time interval—that is, the values reported for the exposure variables as being the values when that time interval occurred), prior forecast exposure variable data (the values forecast for the time interval from a prior time interval) and future forecast exposure variable data (the values forecast during that time interval for a future time period). Prior forecast exposure variable data and future forecast exposure variable data may include forecasted values provided by an exposure variable data source or forecast by HDS 100.

Further HDS 100, according to some embodiments, also collects data from public health data sources 118 that includes actual incidents of disease and causes of death. This data can be used to compare actual recorded exposures to continuously refine the accuracy of forecasting and benchmark thresholds provided by HDS 100.

Health profiles 108 includes individualized health profiles for users. An individualized health profile includes data such as home address, work office address, date of birth, height, weight, pre-existing conditions, medications, and activities. In some embodiments, HDS 100 accesses data for populating an individual's health profile from private health data sources 120 to which HDS 100 is given access, such as electronic health record systems. In addition, or in the alternative, users provide data for health profiles using, for example, online forms. In some embodiments, at least a portion of a user's individualized health profile is provided by a wearable device (e.g., blood pressure, heart rate, etc.). An individualized health profile may also include, for example, scheduled activities/locations. In some embodiments, scheduled activities/locations are provided by an agent running on a user's computer or an enterprise computer that can dynamically access the user's calendars.

A user connects to HDS 100 using a client device (e.g., client device 130) and, according to one embodiment, provides user geolocation data 132 to HDS 100. In one embodiment, for example, an AI agent 134 running on client device 130 scans a user's calendar entries and sends corresponding dates and locations to HDS 100. In another embodiment, the user enters scheduled locations via a user interface. For example, a user may input a trip itinerary or other indication of future locations and the times the user plans to be at those locations, and HDS provides environmental exposure and early health alerts and notifications to the user for the expected locations and times and based on the user's individual health profile 230.

HDS 100 forecasts exposures for the geolocations during the time intervals at which the user is expected to be at the geolocations and generates various alerts early health risk warning. In some embodiments, the alerts and other health related information are superimposed on an electronic map 136 displayed to the user. Thus, the individual can avoid, circumvent or bypass potentially unhealthy or dangerous forecasted exposures at future places and points in time.

Figure 2:
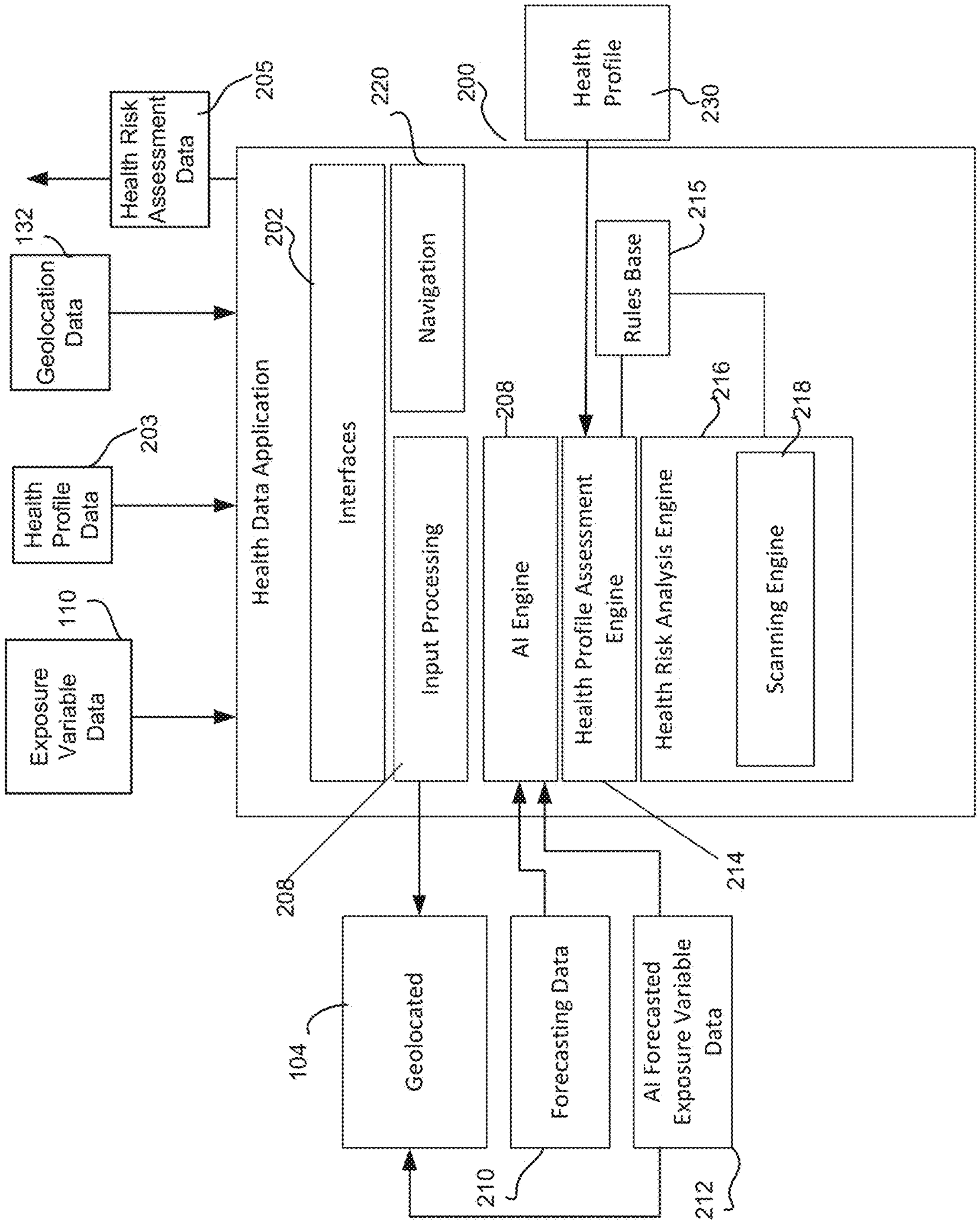
FIG. 2 is a diagrammatic representation of one embodiment of an artificial intelligence health data application.

According to one embodiment, health data system 100 comprises an artificial intelligence health data application (AI-HDA). FIG. 2 is a diagrammatic representation of one embodiment of an AI-HDA 200. AI-HDA 200 comprises one or more applications (instructions embodied on a computer readable media) configured to implement one or more interfaces 202 utilized by HDS 100 to gather data from or provide data to client computing devices, data sources, databases or other components.

According to one embodiment, AL-HDA 200 includes an AI engine 208 that forecasts values of exposure variables for future time intervals. The forecasted values are used in combination with a user's individual health profile to determine susceptibility scores for the individual. The susceptibility scores provide a quantitative assessment of the individual's susceptibility for a geolocation and time interval. A susceptibility score may provide an overall score for the individual or a score for a particular type of health event. Thus, for example, AI-HDA 200 can output an indication of a risk of a health event, such as the overall risk of a health event or the risk of a particular type of health event, depending on embodiment. In some embodiments the indication includes a numeric score indicative of risk. In addition, or in the alternative, the indication may include text, colors, icons or features displayable in a graphical user interface to alert the individual as to the risk level.

Interfaces 202 include interfaces to connect to various sources of data, such as data sources 112, 114, 116, 118, 120, client computing devices, or other sources of data. It will be understood that the particular interface utilized in a given context depends on the functionality being implemented by HDS 100, the type of network utilized to communicate with any particular system, the type of data to be obtained or presented, the time interval at which data is obtained from the entities, the types of systems utilized. Thus, these interfaces may include, for example, web pages, web services, a data entry or database application to which data can be entered or otherwise accessed by an operator, APIs, libraries or other types of interfaces which are desired to utilize in a particular context.

AI-HDA 200 comprises code to process data obtained by HDS 100 to generate processed data and to generate processed data to generate further processed data. Different combinations of hardware, software, and/or firmware may be provided to enable interconnection between different modules of the system to provide for the obtaining of input information, processing of information and generating outputs.

AI-HDA 200 connects to various data sources to collect exposure variable data 110. For example, AI-HDA 200 continually ingests exposure variable data 110 from the data sources based on a schedule, as rate limited by the APIs of the data sources, or based on another scheme. Interfaces 202 further include interfaces for collecting health profile data 203 (e.g., from private health data sources 120 or directly from users) and geolocation data 132 and providing health risk assessment data 205. More particularly, AI-HDA determines susceptibility ratings for individuals based on the individuals' health profiles (e.g., a dynamic health profile 230 of a user, which may be a health profile in health profiles 108) and provides indications of exposure risks. In some embodiments, AI-HDA 200 presents exposure warnings or other information about exposure risks through a user interface that presents a granular dynamic geolocation map of exposures.

Input processing 206 comprises rules for normalizing and mapping exposure variable data 110 from the various data sources to a common geolocation and time interval system used by AI-HDA 200 for geolocated data 104 and storing data in a format that can be input into AI. AI-HDA 200 thus builds a granular dynamic geolocation dataset of exposures that are potentially detrimental to an individual's personal health profile.

Data sources may provide exposure variables at different levels of temporal or geographic granularity from each other or as used by AI-HDA 200 for generating alerts. For example, a data source that provides weather forecasts may provide temperature data for zip codes on a per hour basis while another data source that provides disease exposure data may provide data for each state on a per week basis. Input processing 206 comprises rules for normalizing and mapping exposure variable data 110 from the various data sources to the common geolocation and time interval system used by AI-HDA 200 for geolocated data 104. For example, in an embodiment in which AI-HDA 200 uses a postal code level of granularity, but a data source provides exposure variable data at the state level, AI-HDA 200 maps the variable values provided for the state level of granularity to every postal code in that state. Similarly, in an embodiment in which AI-HDA 200 uses minute time intervals, but a data source provides exposure variable data at a per hour level of granularity, AI-HDA 200 maps the exposure variable data for the hour to every minute interval corresponding to that hour. On the other hand, if a data source provides data on a per second level of granularity such that there are 60 samples for every minute interval used by AI-HDA 200, AI-HDA 200 may apply various techniques to select the value for the minute interval such as, but not limited using the first sample corresponding to the interval, using the last sample corresponding to the interval, averaging the samples, using the highest value sample, using the lowest value sample or determining the value for an interval according to other rules.

AI engine 208 is a predictive AI that is capable of identifying patterns in terms of variables that trend together, the sequence/order in which the variables move and the velocity of movement of each respective variable in relation to the other variables. In one embodiment, AI engine 208 comprises a Long Short-Term Memory (LSTM) network trained on a large set of geolocated exposure variable data, though other forms of artificial intelligence and combinations of AI networks may be used in other embodiments. As will be appreciated, the data used for training AI engine 208 may include historical data that is of limited value and the data may be weighted to limit the influence of older data.

Based on a provided geolocation (e.g., a geolocation in or derived from geolocation data 132), AI-HDA 200 loads forecasting data 210 into memory. Forecasting data 210 includes current environmental, disease and toxin exposure variable data for the geolocation and a defined, recent time increment (e.g., variable data for times in the last n months, last n weeks, last n minutes, last n seconds, last n milliseconds). In some embodiments, forecasting data 210 also includes forecasted exposure variable data for the geolocation and times in the time increment. Different time increments may be used for different exposure variables. The forecasting data 210 may also include the time interval for which the forecast is requested.

According to one embodiment, AI-HDA 200 accesses APIs to obtain the exposure variable data for the geolocation and time increment (e.g., if not already obtained based on scheduled API calls). In addition, or in the alternative, AI-HDA loads forecasting data 208 from stored geolocated data 104. Thus, according to one embodiment, the data used to make predictions is limited to relatively new data.

AI engine 208 uses the current exposure variables from this limited data set (forecasting data 210) to identify patterns in terms of exposure variables that trend together, the sequence/order in which the exposure variables move and the velocity of movement of each respective exposure variable in relation to the other variables. From these patterns of variables that trend together, order in which the exposure variables move and the respective velocities, AI engine 208 forecasts the variable values of the exposure variables for a future time interval and geolocation (AI forecasted exposure variable data 212), such as a time interval at which an individual is scheduled to be at the geolocation. AI forecasted exposure variable data 212 may be stored as part of geolocated data 104 as forecast data for the appropriate geolocation and time intervals.

In some cases, forecasting data 210 includes forecast exposure variable data forecast by a trusted source. AI-HDA 200, in some embodiments, is configured to use trusted forecast values of some exposure variables when generating AI forecasted exposure variable data 212. For example, because some weather forecasts provide highly accurate forecasts of temperature, AI engine 208 may be configured to use the forecast temperature values when forecasting other exposure variables.

As AI-HDA 200 dynamically receives more data for exposure variables, current geolocation exposures are stored in memory and, from the stored geolocation exposures, AI engine 208 identifies patterns in terms of variables that trend together, and the sequence/order in which the variables move and the velocity of movement of each respective variable in relation to the other variables. Examples of geolocation exposures include environmental exposures, disease exposures, and toxin exposures.

AI-HDA 200 stores forecasted exposures generated by AI-HDA 200 or ingested from third parties (e.g., as part of geolocated data 104). Confidence levels of forecasted exposures for a time interval are compared with stored variable behaviors and associations. For example, confidence levels of current forecasted exposures are compared with recently stored variable behaviors and associations that allow for health alerts and notifications to be generated with longer range forecasts and with greater accuracy.

As discussed, based on recent data and identified patterns, AI engine 208 forecasts exposures (exposure variable values) for various geolocations at future time intervals. Over time, the accuracy of these forecasts can be compared to actual recorded exposures to continuously refine the accuracy of forecasting and benchmark thresholds. The forecast exposures can be used to generate health alerts and provide other information to users.

Thus, in one embodiment of operation, AI-HDA 200 receives geolocation data 132, including related temporal data in some cases, and accesses APIs to obtain or loads from geolocated data 104 current environmental, disease and toxin exposures for a recent time increment and, in some embodiments forecasted environmental, disease and toxin exposures for further time intervals. AI engine 208 generates AI forecasted exposure variable data 212 (forecasted exposures) on demand for a geolocation and future time. In other embodiments, AI engine 208 produces geolocation based forecasts that are cached for a short time or stored for a longer period of time, allowing forecasts to be served more quickly. Benchmarks can be applied systematically to generate alerts based on current values of exposure variables and coupled exposure variables and forecast values of the exposure variables.

For example, a pattern may be discovered that, for a first geolocation, the direction and rate at which a first exposure variable changes depend on the directions and rates at which two other exposure variables change. Thus, the rate and direction of change of the other two exposure variables (from recent data from the geolocation or forecast data) can be used to forecast the value of the first exposure variable at future times for the geolocation. If a user is susceptible to an exposure risk based on the value of the first exposure variable and their individual health profile, the system may generate an alert for the user for the time interval in which the first exposure variable is forecast to be detrimental to the user's health. However, a different pattern can be found for other geolocations. As such, AI engine 208 identifies patterns in terms of variables that trend together, and the sequence/order in which the variables move and the velocity of movement of each respective variable in relation to the other variables on a geolocation basis and generates forecasts for future time intervals on a per-geolocation basis.

AI-HDA 200 comprises a health profile assessment engine 214. Personal health profile assessment engine 214 accesses an individual's health profile and uses the values of attributes in the individual's health profile to determine a set of variables (single or coupled variables) and the thresholds for the variables.

One short example of a dynamic health profile 230 includes the following data:

Age: e.g., 65+
Health: e.g., Obese (Dynamic Access to Body Mass Index (BMI) APIs)
Medical conditions: e.g., Asthma, Diabetes
Home Address
Work Address
Scheduled Locations (e.g., from dynamic access to calendars, input via a form, or otherwise collected)
Scheduled Activities (e.g., from dynamic access to calendars, input via a form, or otherwise collected).

Personal health profile assessment engine 214 further determines the specific exposures to observe and what thresholds constitute a health risk based on the individual's health profile. It will be appreciated that public health guidelines, environmental guidelines and scholarly studies suggest features that represent exposure risks and benchmarks for "single variables" and "coupled variables" where "single variables" are variables that by themselves represent a health risk when their values meet certain thresholds and "coupled variables" are variables that, in combination, represent a health risk at certain values. In the case of "coupled variables," the range between the thresholds for each variable is generally reduced as a result of the increased collective health risk of coupled variables.

According to one embodiment, metrics for exposures are standardized on a common scale and thresholds established based on generally accepted guidance and standards. Thus, personal health profile assessment engine 214 can be provided with a rules base 215 that embodies accepted guidelines or standards, guidance from public health guidelines, environmental guidelines, or scholarly studies to select the specific environmental exposures to observe or to determine the health risk thresholds that constitute risk for the individual based on the individual's personal and health attributes. For example, rules base 215 may, based on accepted guidance and standards, dictate that one set of exposure variables and health risk thresholds if the user has asthma, but is not overweight, but another set of exposure variables and health risk thresholds to observe if the user has asthma and is overweight. Thus, based on the rules of rules base 215, health profile assessment engine 214 can determine the single or coupled variables to be observed and their corresponding thresholds that represent risks for the individual.

For example, personal health profile assessment engine 214 may determine from rules base 215 and the individual's health profile the following thresholds for the individual:

Temp above 85° F. (single variable)
Temp 76° F. or above combined with Humidity greater than 65% (coupled variable)
Temp less than 32° F. (single variable)
Temp less than 41° F. combined with Humidity less than 35% (coupled variable)
Pressure less than 1009 mbar (single variable)
AQI greater than 51 (single variable)
PM2.5 greater than 12 (single variable)
O3 greater than 51 (single variable)
NO2 greater than 51 (single variable)
SO2 greater than 100 (single variable)
Altitude greater than 3,500 ft (single variable)

While the above example of variables to observe and thresholds includes environmental exposure variables for the sake of examples, the observed to monitor may also include one or more disease exposure variables, one or more toxin exposure variables, or types of exposure variables. As discussed, the variables and thresholds may be determined based on rules that, for example, embody published relationships. Further, in some embodiments, these relationships may be determined or refined over time using machine learning.

One or more attributes from the personal health profile can be considered "personal and health attribute(s)." According to one embodiment, personal health profile assessment engine 214 assigns susceptibility scores to the individual based on the individual's health profile based on the values of the personal and health attributes. According to one embodiment, for each of the personal and health attributes of an individual's personal health profile, personal health profile assessment engine 214 a susceptibility score in relation to exposures. For example, each personal and health attribute, such as age, BMI, medical condition, work location, residence location, is assigned a score of 1 (lowest) to 5 (highest). The value assigned to a personal and health attribute according to one embodiment, is related to the values of one or more exposure variables. In an even more particular embodiment, the value assigned to a personal and health, is related to the values of one or more observed single or coupled variables.

In one embodiment, the personal and health attributes can be assigned a score for defined health risks or categories of health risks. For example, in one embodiment, personal health profile assessment engine 214 assigns individual susceptibility scores for a risk of cardiac event to personal and health attributes (e.g., all personal and health attributes or a selected subset, such as those correlated with a risk of a cardiac event), individual susceptibility scores for a risk of a respiratory event to personal and health attributes (e.g., all personal and health attributes or a selected subset, such as personal and health attributes correlated with a risk of a respiratory event), and individual susceptibility scores for a risk of a cerebral event to personal and health attributes (e.g., all personal and health attributes or a selected subset, such as those correlated with a risk of a cerebral event). Based on the susceptibility risk scores assigned to individual personal and health attributes for a particular health risk or type of health risk, a susceptibility risk score for the health risk or health risk type can be determined. In some embodiments, personal health profile assessment engine 214 calculates susceptibility risk stores for various health risks or categories of health risks based on the values of personal and health attributes and exposure variables (current or forecast).

According to one embodiment, rules base 215 includes rules for mapping personal and health attribute values to susceptibility scores for exposures and co-exposures (e.g., based on values for single variables or coupled variables). For example, a rule might specify how certain personal and health attributes and single or coupled exposure variables relate to a risk of a respiratory event so that a susceptibility risk score of a respiratory event can be determined based on the individual's health profile and current or forecast exposure variables.

The rules to determine exposures (e.g., environmental, disease, toxin exposures) to monitor, susceptibility scores and thresholds are embodied, in some embodiments, in a set of coded rules, a machine learning model, or combination thereof. In some embodiments, actual health data (e.g., death certificate data or other data from public health data sources 118) can be used to refine the rules for determining single variables, coupled variables and thresholds and to refine relationships between health attributes, exposure variables, and susceptibility scores.

According to one embodiment, the susceptibility scores for the risk categories are used to trigger alerts. For example, if the susceptibility score for a cerebral event meets a susceptibility score threshold, a cerebral event alert is triggered. Personal health profile assessment engine 214 outputs personalized alerts for an individual based on a number of factors, including the individual's health profile. As discussed, the alerts may be generated based on rules applied to the susceptibility scores assigned to the attributes of the individual's health profile. Examples of notifications include, but are not limited to, pre-existing condition discrete alerts such as alerts related to respiratory, cardiovascular, and cerebral events. Personal health profile assessment engine 214 may also generate environmental, disease, or toxin alerts for a given geolocation in relation to the individual's personal health profile 230, where single or coupled variables exceed thresholds or are trending toward thresholds. The alerts are generated based on how a unique individual health profile is likely to be affected by forecasted exposures for a unique geo-location. The alerts can be generated on a per exposure variable (single variable or coupled variable basis) or for risks or categories of risks correlated with the exposure variables, but not included in the variables. Thus, different individuals may receive different alerts (or one individual may receive an alert and another individual not receive an alert) for the same location/time where the difference is based on the individuals' unique health profiles. Further, the same individual may receive different alerts for the same location, but different times due to differences in the exposures forecast for that location for the different times. Similarly, the same individual may receive different alerts for the same time but different locations due to differences in the exposures forecast for those locations for that time.

AI-HDA 200 comprises a health risk analysis engine 216 which uses the single and coupled variables to observe and the associated thresholds that constitute risk for the individual to determine exposure risk score for the individual, which in turn can be included in or used to trigger alerts on a per individual/geo-location/time interval basis.

According to one embodiment, health risk analysis engine 216 uses the thresholds determined by personal health profile assessment engine 214 to determine individualized exposure risk scores based on current or forecast exposure risks on an individual/geo-location/time interval basis. In an even more particular embodiment, health risk analysis engine 216 determines exposure risk scores based on the thresholds and exposure variable data (current or forecast) for various geolocations and time intervals.

According to one embodiment, exposure variables are given numerical values (risk factor numerical score) representing a factor of risk based on the unique range and threshold of each variable, based on each variable's unique scale of measurement. In some embodiments, an exposure variable is only given a risk factor numerical score for an individual, geolocation, time interval tuple if the single variable or coupled variable meets an associated health risk threshold. In other embodiments, all the single or coupled variables are assigned a risk factor numerical score, but only the risk factor numerical scores for those variables that meet risk thresholds are aggregated into an overall exposure risk score for the individual, geolocation, time interval tuple. In other embodiments, all the observed single or coupled variables are assigned a risk factor numerical score, and the scores for all the observed single or coupled variables are aggregated. In some embodiments, the aggregate risk score is only provided in an alert if an alert is triggered by a susceptibility risk score. In other embodiments, individual numerical risk scores or an aggregate risk score can trigger alerts.

In one embodiment, health risk analysis engine 216 includes a scanning engine 218 that scans the exposure variable data (e.g., current or forecast) for a geolocation and time interval to determine any variables (single or coupled) that have met an associated health risk threshold for the variable. Thus, AI-HDA 200 identifies the single variables and coupled variables (two or more variables collectively) that exceed thresholds and also observes the trends of variables that have not (yet) exceeded thresholds to provide the earliest possible health alerts and notifications. The rules for mapping values of observed single and coupled variables to risk scores may be embodied as rules in rules base 215. In some embodiments, the rules embody relationships from accepted guidelines or standards, guidance from public health guidelines, environmental guidelines, or scholarly studies.

As an example of a risk score with respect to a single variable using the temperature threshold example provided above, a current or forecast temperature that exceeds a threshold, such as below 32° F. or above 85° F., receives a risk factor numerical score, according to one embodiment.

As an example of a risk score with respect to a coupled variable (temperature and humidity), using the example thresholds provided above, a temperature below 41° F. combined with humidity less than 35% or a temperature above 76° F. combined with a humidity greater than 65%, receives a risk factor numerical score, according to one embodiment.

Health risk analysis engine 216 sums the risk factor numerical score for each single variable and each coupled variable where a health risk threshold has been crossed and calculates an aggregate exposure risk score. Aggregate exposure risk scores are determined, according to one embodiment, for individual-geolocation-time interval tuples. The aggregate exposure risk score for an individual-geolocation-time may be considered a general susceptibility score as it provides a quantitative assessment of an overall risk of a health event but is not specific to a category of health event. The individual risk factor numerical scores or aggregate risk scores can be used to trigger alerts or can be provided in alerts, in some embodiments. For example, an alert may also include one or more of the individual risk factor numerical score or the aggregate risk score.

As discussed, AI engine 208 can be used to forecast exposure variable values and allow AI-HDA 200 to identify patterns and correlations of exposure variables, which can accelerate the generation of individualized alerts in addition to improving accuracy over time. As such, AI engine 208 can identify patterns in terms of personal and health attributes that trend together or that trend with exposure variables, and the sequence/order in which the attributes move and the velocity of movement of each respective attribute in relation to the other attributes or exposure variables. Thus, the values for one or more personal and health attributes used when accessing susceptibility risk for a future time are, in some embodiments, values forecast for that individual for that time interval and, even further in some embodiments, a specific geolocation.

In some embodiments, exposure and health risk alerts can be integrated with route planning. One embodiment, for example, provides a user interface through which the user can enter a starting point, a destination, and a time of departure. A navigation component 220 uses internal route planning or makes calls to publicly available map APIs to determine a route and estimate the time at which the individual will be at various geolocations along the route. Navigation component 220 calls AI engine 208 to make forecasts for the geolocations and future times. Health profile assessment engine 214 and health risk analysis engine analyze the forecast exposure variables to determine alerts and return the alerts to navigation component 220, which adds the alert data to the returned navigation data for display to the user.

Figure 3:
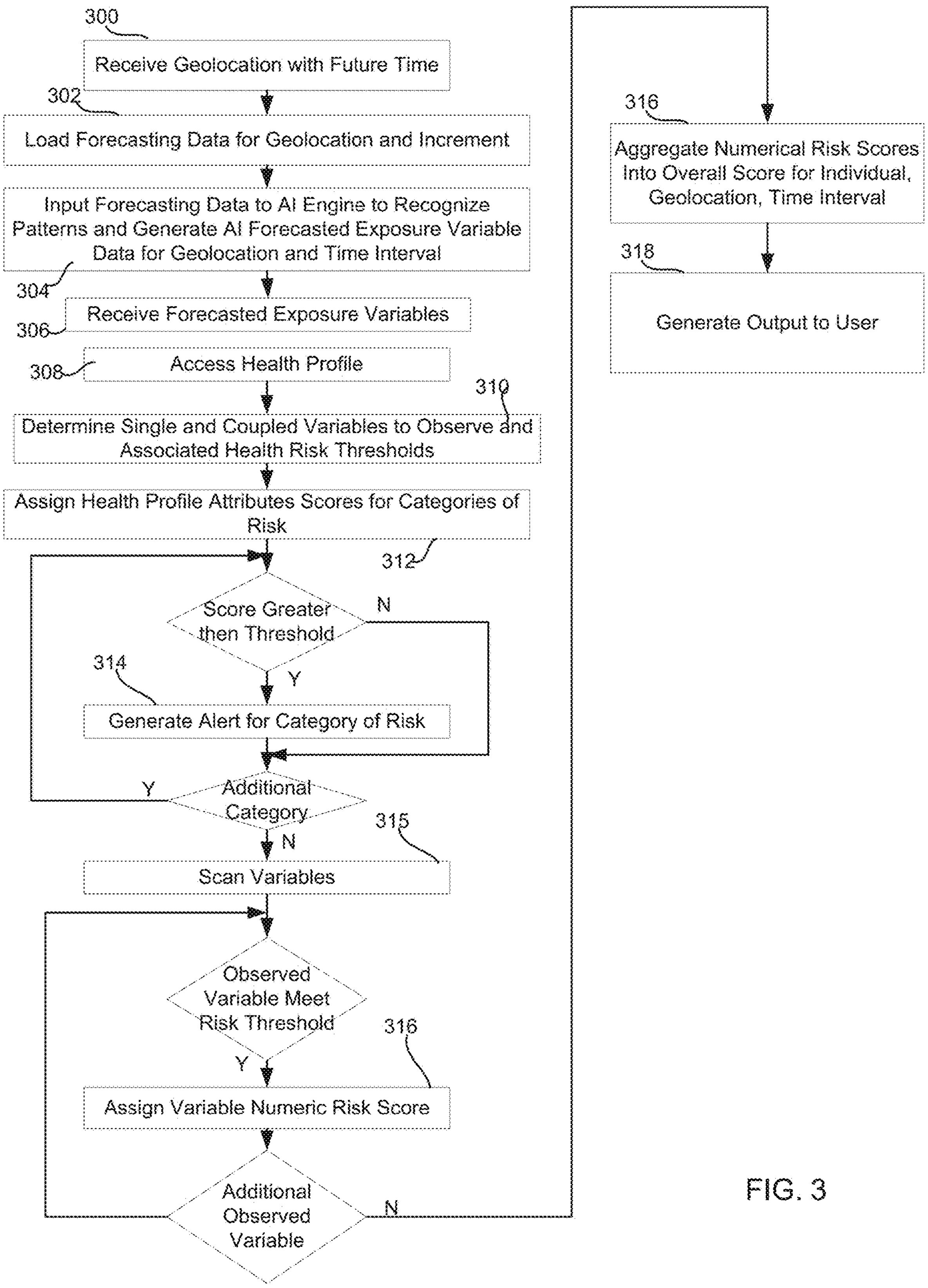
FIG. 3 is a flowchart illustrating one embodiment of a method of generating early health alerts.

FIG. 3 illustrates one embodiment of a method for environmental exposure and early health risk alerts. In one embodiment, the steps of FIG. 3 are embodied as computer-executable instructions stored on a non-transitory, computer-readable medium. For example, one or more steps of FIG. 5 may be implemented by AI-HDA 200.

At step 300, an HDS (e.g., HDS 100) receives geolocation and associated future time data. In one embodiment, for example, a user inputs a trip itinerary or other indication of future locations and the times the user plans to be at those locations. In another embodiment, a smart agent on the user's computer or with dynamic access to the user's calendar provides location and time data from the user's calendar. In yet another embodiment, a navigation component of the HDS provides a geolocation and future time based on route planning.

At step 302, the HDS loads data for forecasting (e.g., forecasting data 210) into volatile memory. The forecasting data comprises current exposure variable data for the geolocation and a defined, recent time increment (e.g., variable data for times in the last n months, last n weeks, last n minutes, last n seconds, last n milliseconds). In some embodiments, different time increments may be used for different exposure variables. The forecasting data, in some embodiments, also includes forecasted exposure variable data for the geolocation and times in the time increment.

According to one embodiment, the HDS accesses APIs to obtain the exposure variable data for the geolocation and time increment (e.g., if not already obtained based on scheduled API calls). In addition, or in the alternative, the HDS loads forecasting data from stored geolocated data.

At step 304, the forecasting data with the time interval for which a forecast is requested is input to an AI engine (e.g., AI forecaster 208) to identify patterns in terms of exposure variables that trend together, the sequence/order in which the exposure variables move and the velocity of movement of each respective exposure variable in relation to the other variables. From these patterns of variables that trend together, order in which the exposure variables move and the respective velocities, the AI engine forecasts the exposure variable values for the time interval. Thus, at step 306, AI forecasted exposure variable data is received.

The current exposure variables may be cached, stored in persistent storage, or discarded once the forecast is made. Forecasted exposure variable data for the time interval may be cached, stored in persistent storage, or discarded once no longer needed.

At step 308, the HDS accesses an individual health profile for the user. At step 310, the HDS determines the specific exposures to observe and what thresholds constitute a health risk based on the individual's health profile. According to one embodiment, a rules base (e.g., rules base 215) that embodies accepted guidelines or standards, guidance from public health guidelines, environmental guidelines, or scholarly studies to select the specific environmental exposures to observe or to determine the health risk thresholds that constitute risk for the individual based on the individual's personal and health attributes. Thus, based on the rules, the HDS can determine the single or coupled variables to be observed and their corresponding thresholds that represent risks for the individual.

At step 312, the HDS determines a susceptibility score for the user for one or more categories of health risk, such as a risk of cardiac event, a risk of respiratory event, a risk of cerebral event in one embodiment. In one embodiment, the HDS assigns individual susceptibility scores for a risk of cardiac event to personal and health attributes (e.g., all personal and health attributes or a selected subset, such as those correlated with a risk of a cardiac event), individual susceptibility scores for a risk of a respiratory event to personal and health attributes (e.g., all personal and health attributes or a selected subset, such as personal and health attributes correlated with a risk of a respiratory event), and individual susceptibility scores for a risk of a cerebral event to personal and health attributes (e.g., all personal and health attributes or a selected subset, such as those correlated with a risk of a cerebral event). Based on the susceptibility risk scores assigned to individual personal and health attributes for a particular health risk or type of health risk, a susceptibility risk score for the health risk or health risk type can be determined. In some embodiments, the HDS calculates susceptibility risk stores for various health risks or categories of health risks based on the values of personal and health attributes and exposure variables (current or forecast).

If the susceptibility score for a risk category meets an alert threshold, an alert is generated for the category (step 314). In some embodiments, the severity of the alert is based on the score with ranges of scores mapping to different levels of risk (e.g., low, medium, high).

At step 315, the HDS scans the exposure variables to determine for a geolocation and time interval to determine any variables (single or coupled) that have met an associated health risk threshold for the variable. Exposure variables are given numerical values (risk factor numerical score) representing a factor of risk based on the unique range and threshold of each variable, based on each variable's unique scale of measurement. In some embodiments, an exposure variable is only given a risk factor numerical score for an individual, geolocation, time interval tuple if the single variable or coupled variable meets an associated health risk threshold. In other embodiments, all the single or coupled variables are assigned a risk factor numerical score, but only the risk factor numerical scores for those variables that meet risk thresholds are aggregated into an overall exposure risk score for the individual, geolocation, time interval tuple.

At step 316, the HDS sums the risk factor numerical score for each single variable and each coupled variable where a health risk threshold has been crossed and calculates an aggregate exposure risk score. Aggregate exposure risk scores are determined, according to one embodiment, for individual-geolocation-time interval tuples.

In some embodiments, the individual risk factor numerical scores or aggregate risk scores can be used to trigger alerts or can be provided in alerts, in some embodiments.

At step 318, the HDS generates an output that includes any alerts generated based on the risk categories and may include additional information, such as risk scores.

FIG. 3 is merely an illustrative example, and the disclosed subject matter is not limited to the ordering or number of steps illustrated. Embodiments may implement additional steps or alternative steps, omit steps, or repeat steps.

Figure 4:
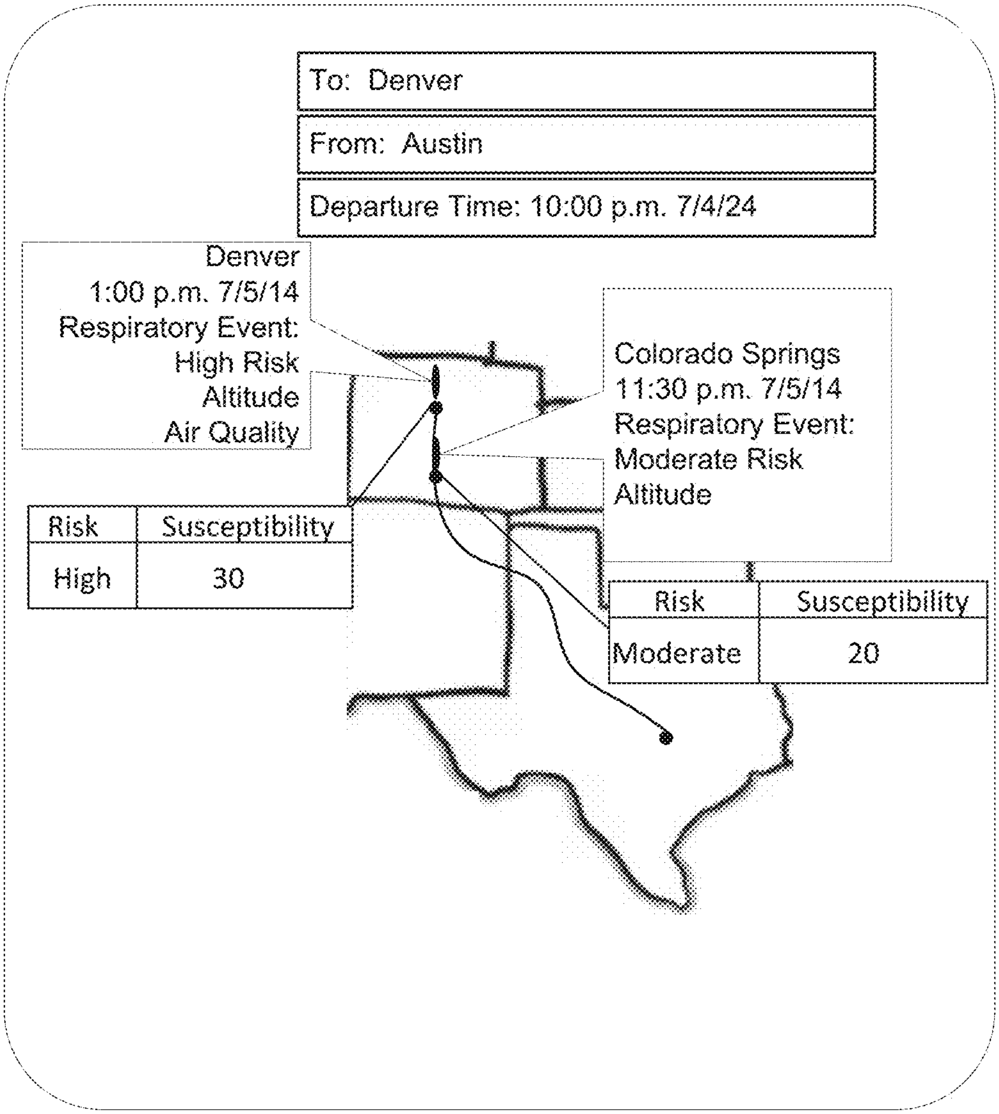
FIG. 4 is a diagrammatic representation of one embodiment of a user interface integrating early health alerts.

FIG. 4 illustrates an embodiment of a user interface for a routing service in which an individual has entered a starting point of Austin and destination of Denver. In this example, the HDS (e.g., HAD 100) has predicted the time that the individual will reach various cities along the route, forecast exposure variables and generated alerts. FIG. 4 also illustrates an example of an aggregate risk and score for the individual for the locations and times.

In another embodiment, the user interface provides an interactive map in which the user can change the level of zoom. Tools of the interface allow the user to select which types of forecasted health data and alerts the user wishes to see, which are overlaid on the map based on the level of zoom.

Figure 5:
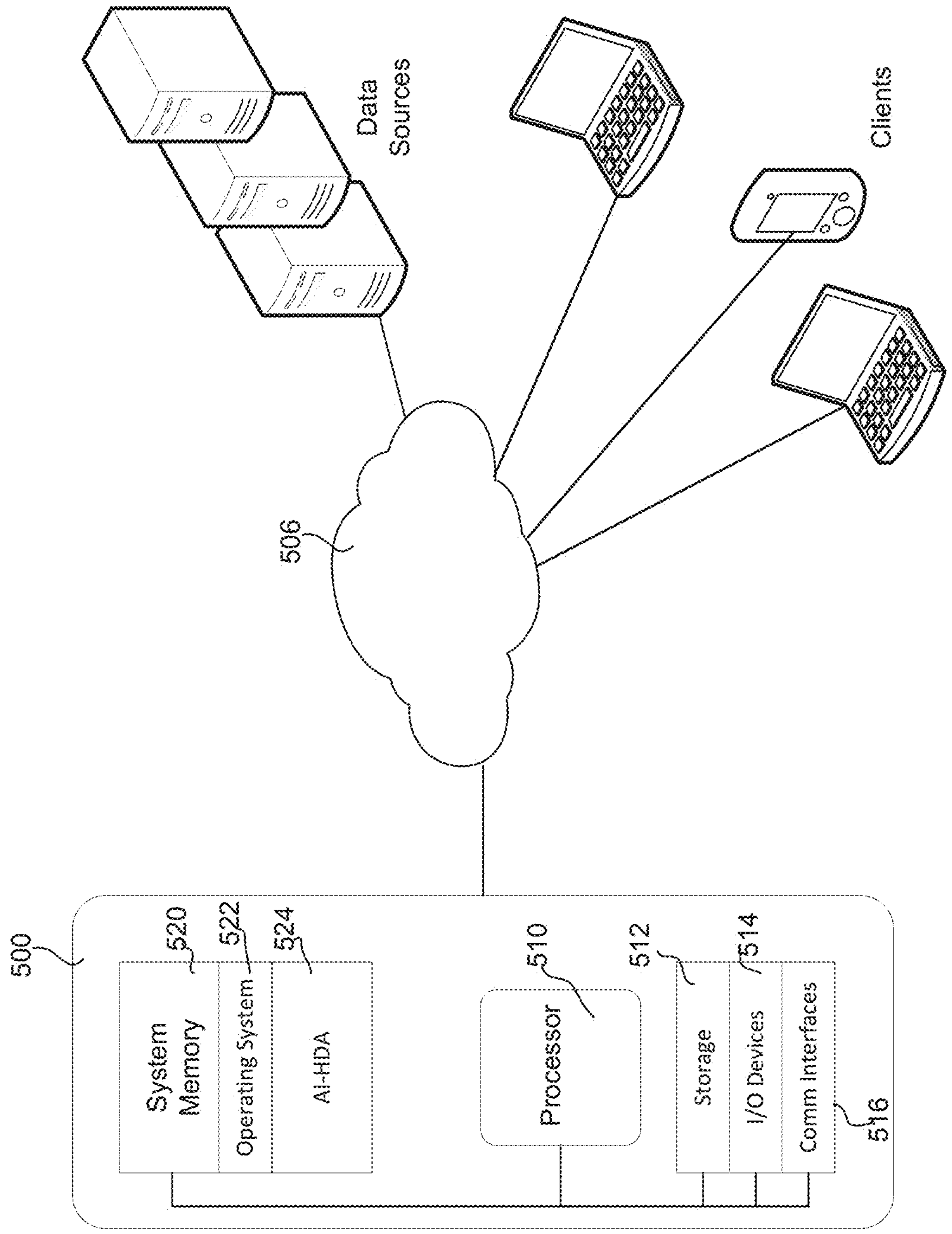
FIG. 5 is a diagrammatic representation of one embodiment of a computer network environment.

FIG. 5 is a diagrammatic representation of one embodiment of a computing environment that includes HDS 500, which represents one embodiment of HDS 100 or another HDS, connected to client computers and data sources via a network 506. HDS 500, according to one embodiment, is a cloud computing system.

HDS 500 includes a processor 510 and memory 520. Memory 520 (storing, among other things, executable instructions) may be volatile (such as RAM), non-volatile (such as ROM, flash memory, etc.), or some combination of the two. Further, HDS 500 may also include storage devices 512, such as, but not limited to, solid state storage. HDS 500 may also have input device(s) and output device (I/O devices 514) such as keyboard, mouse, pen, voice input, touch screen, speakers. HDS 500 further includes communications interfaces 516, such as a cellular interface, a Wi-Fi interface, or other interfaces.

HDS 500 includes at least some form of non-transitory computer-readable media. The non-transitory computer-readable readable media can be any available media that can be accessed by processor 510 or other devices comprising the operating environment. By way of example, non-transitory computer-readable media may comprise computer storage media such as volatile memory, nonvolatile memory, removable storage, or non-removable storage for storage of information such as computer readable-instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

As stated above, a number of program modules and data files may be stored in system memory 520. While executing on processor 510, program modules (e.g., applications, Input/Output (I/O) management, and other utilities) may perform processes including, but not limited to, one or more of the stages of the operational methods described with respect to HDS 100. In one embodiment, system memory 520 stores an operating system 522 and an AI-HDA 524. System memory 520 may include other program modules such as program modules to provide analytics or other services. Furthermore, the program modules may be distributed across computer systems in some embodiments.

Portions of the methods described herein may be implemented in suitable software code that may reside within RAM, ROM, a hard drive or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A system for providing geolocated, early health alerts comprising:
- a processor;
- a volatile memory coupled to the processor;
- a second memory coupled to the processor storing:
  - granular dynamic geolocation map dataset of exposures;
  - health profiles;
  - code comprising computer-executable instructions executable by the processor for:
    - receiving geolocation data for an individual, the geolocation data comprising a geolocation and a future time;
    - accessing, from the second memory, a health profile for the individual, the health profile comprising personal health and data attributes for the individual;
    - loading into the volatile memory, current exposure variables for a defined time interval, the current exposure variables representing conditions that are potentially detrimental to the health of the individual;
    - analyzing by an artificial intelligence engine the current exposure variables to:
      - identify a pattern in the current exposure variables, the pattern comprising identified variables that trend together, an order in which the identified variables move, and a velocity of movement of each respective identified variable relative to the other identified variables; and
      - use the pattern in the current exposure variables to forecast future exposure variables at the future time;
    - determining based on the personal health and data attributes and the forecasted future exposure variables that the individual is at risk of a health event; and
    - generating an alert to the individual of the health event, the alert associated with the geolocation and future time, wherein the alert is overlaid on a digital map.

2. The system of claim 1, wherein the code further comprises instructions executable for:
- scanning the future forecasted exposure variables for a single variable or a coupled variable that meets a health risk threshold; and
- based on the single variable or coupled variable meeting the health risk threshold, increasing a risk score for the individual for the geolocation and the future time.

3. The system of claim 2, wherein the code further comprises instructions executable for:
- identifying the single variable or the coupled variable and the health risk threshold based on the health profile of the individual.

4. The system of claim 1, wherein the current exposure variables comprise at least one of an environmental exposure variable, a disease exposure variable, or a toxin exposure variable.

5. The system of claim 1, wherein the code further comprises instructions executable for building the granular dynamic geolocation map dataset of exposures.

6. A non-transitory, computer-readable medium storing thereon code executable by a processor, the code comprising instructions executable for:

receiving geolocation data for an individual, the geolocation data comprising a geolocation and a future time;

accessing a health profile for the individual, the health profile comprising personal health and data attributes for the individual;

loading into a volatile memory, current exposure variables for a defined time interval, the current exposure variables representing conditions that are potentially detrimental to the health of the individual;

analyzing by an artificial intelligence engine the current exposure variables to:

identify a pattern in the current exposure variables, the pattern comprising identified variables that trend together, an order in which the identified variables move, and a velocity of movement of each respective identified variable relative to the other identified variables; and use the pattern in the current exposure variables to forecast future exposure variables at the future time;

determining based on the personal health and data attributes and the forecasted future exposure variables that the individual is at risk of a health event; and generating an alert to the individual of the health event, the alert associated with the geolocation and future time, wherein the alert is overlaid on a digital map.

7. The non-transitory, computer-readable medium of claim 6, wherein the code further comprises instructions executable for:

scanning the future forecasted exposure variables for a single variable or a coupled variable that meets a health risk threshold; and based on the single variable or coupled variable meeting the health risk threshold, increasing a risk score for the individual for the geolocation and the future time.

8. The non-transitory, computer-readable medium of claim 7, wherein the code further comprises instructions executable for:

identifying the single variable or the coupled variable and the health risk threshold based on the health profile of the individual.

9. The non-transitory, computer-readable medium of claim 6, wherein the current exposure variables comprise at least one of an environmental exposure variable, a disease exposure variable, or a toxin exposure variable.

10. The non-transitory, computer-readable medium of claim 6, wherein the code further comprises instructions executable for building a granular dynamic geolocation map dataset of exposures.

11. A computer-implemented method for early risk warning comprising:

receiving geolocation data for an individual, the geolocation data comprising a geolocation and a future time;

accessing a memory storing a health profile for the individual, the health profile comprising personal health and data attributes for the individual;

loading into a computer memory, current exposure variables for a defined time interval, the current exposure variables representing conditions that are potentially detrimental to the health of the individual;

analyzing by an artificial intelligence engine the current exposure variables to:

identify a pattern in the current exposure variables, the pattern comprising identified variables that trend together, an order in which the identified variables move, and a velocity of movement of each respective identified variable relative to the other identified variables; and use the pattern in the current exposure variables to forecast future exposure variables at the future time;

determining based on the personal health and data attributes and the forecasted future exposure variables that the individual is at risk of a health event; and generating an alert to the individual of the health event, the alert associated with the geolocation and future time, wherein the alert is overlaid on a digital map.

12. The computer-implemented method of claim 11, further comprising:

scanning the future forecasted exposure variables for a single variable or a coupled variable that meets a health risk threshold; and based on the single variable or coupled variable meeting the health risk threshold, increasing a risk score for the individual for the geolocation and the future time.

13. The computer-implemented method of claim 12, further comprising identifying the single variable or the coupled variable and the health risk threshold based on the health profile of the individual.

14. The computer-implemented method of claim 11, wherein the current exposure variables comprise at least one of an environmental exposure variable, a disease exposure variable, or a toxin exposure variable.

15. The computer-implemented method of claim 11, further comprising building a granular dynamic geolocation map dataset of exposures.

* * * * *